(12) United States Patent
Neunzert et al.

(10) Patent No.: US 8,156,875 B2
(45) Date of Patent: *Apr. 17, 2012

(54) HANDLE FOR A PORTABLE TABLE

(75) Inventors: Martin Neunzert, Ogden, UT (US); Doug Fuller, Ogden, UT (US); Ray Adams, Clearfield, UT (US)

(73) Assignee: Lifetime Products, Inc., Clearfield, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/815,284

(22) Filed: Jun. 14, 2010

(65) Prior Publication Data

US 2010/0242809 A1    Sep. 30, 2010

Related U.S. Application Data

(63) Continuation of application No. 11/112,900, filed on Apr. 22, 2005, now Pat. No. 7,735,431, which is a continuation-in-part of application No. 10/408,914, filed on Apr. 8, 2003, now Pat. No. 7,096,799, and a continuation-in-part of application No. 10/843,037, filed on May 10, 2004, now Pat. No. 7,640,870.

(60) Provisional application No. 60/564,393, filed on Apr. 22, 2004.

(51) Int. Cl.
*A47B 3/00* (2006.01)

(52) U.S. Cl. ......................... 108/132; 108/129

(58) Field of Classification Search .................. 108/132, 108/129, 33, 35, 38, 167, 169, 173, 174; 16/126, 125, 430, 444, 445

See application file for complete search history.

(56) References Cited

U.S. PATENT DOCUMENTS

| 429,458 A | 6/1890 | Kraemer |
| 493,441 A | 3/1893 | Munz |
| 643,511 A | 2/1900 | Lloyd |
| 1,257,843 A | 2/1918 | Gonyea |
| 1,514,917 A | 11/1924 | Lotz |

(Continued)

FOREIGN PATENT DOCUMENTS

CN    2414667    12/2000

(Continued)

OTHER PUBLICATIONS

US. Appl. No. 12/033,647, filed Feb. 19, 2008, Branch et al.

(Continued)

*Primary Examiner* — Jose V Chen
(74) *Attorney, Agent, or Firm* — Maschoff Gilmore & Israelsen

(57) ABSTRACT

A table may include a table top that is capable of being folded-in-half. In particular, the table top may include first and second portions that are capable of being moved being moved between a folded position in which the first portion is disposed proximate the second portion and an unfolded position in which the first portion and the second portion are generally aligned in the same plane. The table may also include first and second legs that are movable between an extended position and a collapsed position relative to the table top. In addition, the table may include a handle that facilitates carrying of the table. The handle may include a gripping portion that is sized and configured to be gripped by a user and the handle may be attached to the table top. The table may further include a handle retention assembly that secures the handle in a fixed position.

20 Claims, 7 Drawing Sheets

U.S. PATENT DOCUMENTS

| | | | |
|---|---|---|---|
| 1,543,372 A | 6/1925 | Didricksen |
| 1,614,187 A | 1/1927 | Coggins |
| 1,639,367 A | 8/1927 | Seward |
| 1,765,766 A | 6/1930 | Lyon |
| 1,907,111 A | 5/1933 | Holland et al. |
| 1,976,140 A | 10/1934 | Paul |
| 2,086,463 A | 7/1937 | Bram |
| 2,223,193 A | 11/1940 | Tafel |
| 2,358,883 A | 9/1944 | Rothschild |
| 2,542,394 A | 2/1951 | Cohen et al. |
| 2,596,250 A | 5/1952 | Klinger |
| 2,619,394 A | 11/1952 | Mahr |
| 2,730,418 A | 1/1956 | Blink |
| 2,747,957 A | 5/1956 | Lencioni |
| 2,871,076 A | 1/1959 | Mell |
| 2,872,259 A | 2/1959 | Thorpe |
| 2,987,149 A | 6/1961 | Finkelstein |
| 3,143,982 A | 8/1964 | Blink et al. |
| 3,187,373 A | 6/1965 | Fisher |
| 3,304,891 A | 2/1967 | Rachman |
| 3,368,504 A | 2/1968 | Cohen |
| D212,123 S | 8/1968 | Foote |
| 3,415,208 A | 12/1968 | Thoresen et al. |
| D222,234 S | 10/1971 | Imber |
| 3,656,439 A | 4/1972 | Domin |
| 3,731,971 A | 5/1973 | Sjogren |
| 3,823,938 A | 7/1974 | Unno |
| 3,860,995 A | 1/1975 | Lautenschlager |
| 3,866,913 A | 2/1975 | Zimmers et al. |
| 4,005,898 A | 2/1977 | Way |
| 4,027,600 A | 6/1977 | Mueller |
| D247,080 S | 1/1978 | Robinson |
| 4,089,522 A | 5/1978 | Rock |
| 4,133,271 A | 1/1979 | Carlson |
| 4,286,353 A | 9/1981 | Roche |
| 4,371,202 A | 2/1983 | Freeman |
| 4,489,661 A | 12/1984 | Fitzgerald |
| D281,949 S | 12/1985 | Hartmann |
| 4,567,835 A | 2/1986 | Reese et al. |
| 4,569,545 A | 2/1986 | Hartmann |
| 4,653,804 A | 3/1987 | Yoo et al. |
| 4,841,877 A | 6/1989 | Virtue |
| 4,883,314 A | 11/1989 | Sakong |
| 4,887,536 A | 12/1989 | Teichner |
| 4,911,085 A | 3/1990 | Pencoske |
| 5,009,170 A | 4/1991 | Spehar |
| 5,012,553 A | 5/1991 | Hardigg et al. |
| 5,154,441 A | 10/1992 | White et al. |
| 5,251,359 A | 10/1993 | Finkl |
| 5,357,872 A | 10/1994 | Wilmore |
| 5,377,601 A | 1/1995 | Cashen |
| 5,381,740 A | 1/1995 | Johnston |
| 5,421,272 A | 6/1995 | Wilmore |
| 5,501,157 A | 3/1996 | Westerburgen |
| 5,647,107 A | 7/1997 | Brewster |
| D392,175 S | 3/1998 | Beck |
| 5,730,066 A | 3/1998 | Auten et al. |
| 5,857,650 A | 1/1999 | Lin |
| D407,624 S | 4/1999 | Ehrig |
| D414,626 S | 10/1999 | Collins et al. |
| 5,983,807 A | 11/1999 | Tarnay et al. |
| 6,000,345 A | 12/1999 | Gillotti |
| D420,527 S | 2/2000 | Pinch |
| 6,032,585 A | 3/2000 | Pinch |
| 6,058,853 A | 5/2000 | Pinch |
| 6,112,674 A | 9/2000 | Stanford |
| 6,334,400 B1 | 1/2002 | Nien |
| 6,454,357 B1 | 9/2002 | Foulger |
| D468,135 S | 1/2003 | Ashby et al. |
| D478,495 S | 8/2003 | Votruba et al. |
| D479,778 S | 9/2003 | Haney et al. |
| 6,684,426 B1 | 2/2004 | Lin et al. |
| 6,708,532 B2 | 3/2004 | Winland |
| D489,557 S | 5/2004 | Strong et al. |
| 6,752,091 B2 | 6/2004 | Glover et al. |
| 6,842,923 B1 | 1/2005 | Castellani |
| 6,848,731 B2 | 2/2005 | Khubani |
| 6,905,166 B2 | 6/2005 | Zhurong et al. |
| 6,916,093 B2 | 7/2005 | Quehin |
| 7,096,799 B2 | 8/2006 | Strong et al. |
| 7,111,563 B2 | 9/2006 | Strong |
| 7,143,702 B2 | 12/2006 | Stanford |
| 7,150,237 B2 | 12/2006 | Lin et al. |
| 7,171,910 B2 | 2/2007 | Neunzert et al. |
| 7,178,471 B2 | 2/2007 | Strong et al. |
| 7,278,361 B2 | 10/2007 | Zhurong et al. |
| 7,461,601 B2 | 12/2008 | Jin et al. |
| 7,475,641 B2 | 1/2009 | Jin |
| 7,475,644 B2 | 1/2009 | Strong et al. |
| 7,634,969 B2 | 12/2009 | Neunzert et al. |
| 7,640,870 B2 | 1/2010 | Strong et al. |
| 7,735,431 B2 | 6/2010 | Neunzert et al. |
| 2002/0092445 A1 | 7/2002 | Glover et al. |
| 2005/0005826 A1 | 1/2005 | Strong |
| 2005/0052058 A1 | 3/2005 | Nye et al. |
| 2005/0241550 A1 | 11/2005 | Neunzert |
| 2005/0241551 A1 | 11/2005 | Neunzert |
| 2006/0236905 A1 | 10/2006 | Neunzert et al. |

FOREIGN PATENT DOCUMENTS

GB    2181658    4/1987

OTHER PUBLICATIONS

U.S. Appl. No. 29/219,893, filed Dec. 2004, Jin.
U.S. Appl. No. 29/230,220, filed May 2005, Strong.
Office Action dated Oct. 13, 2005 cited in U.S. Appl. No. 10/408,914.
Office Action dated Aug. 4, 2006 cited in U.S. Appl. No. 29/230,220.
Office Action dated Mar. 15, 2007 cited in U.S. Appl. No. 11/112,810.
Office Action dated Jun. 5, 2007 cited in U.S. Appl. No. 11/510,916.
Office Action dated Nov. 23, 2007 cited in U.S. Appl. No. 11/112,810.
Office Action dated Mar. 28, 2008 cited in U.S. Appl. No. 10/843,037.
Office Action dated Apr. 24, 2008 cited in U.S. Appl. No. 11/112,810.
Office Action dated Jan. 5, 2009 cited in U.S. Appl. No. 10/843,037.
Notice of Allowance dated Jan. 10, 2006 cited in U.S. Appl. No. 29/219,893.
Notice of Allowance dated May 1, 2006 cited in U.S. Appl. No. 10/408,914.
Notice of Allowance dated Oct. 10, 2006 cited in U.S. Appl. No. 29/219,893.
Notice of Allowance dated Apr. 5, 2007 cited in U.S. Appl. No. 29/230,220.
Notice of Allowance dated Sep. 15, 2008 cited in U.S. Appl. No. 11/510,916.
Notice of Allowance dated Nov. 17, 2008 cited in U.S. Appl. No. 11/112,810.
Examination Report from European Patent Application No. 03728359.5 dated Oct. 4, 2010.
U.S. Appl. No. 11/112,810, filed Apr. 22, 2005, Neunzert et al.
U.S. Appl. No. 12/033,647, filed Feb. 19, 2008, Branch et al.

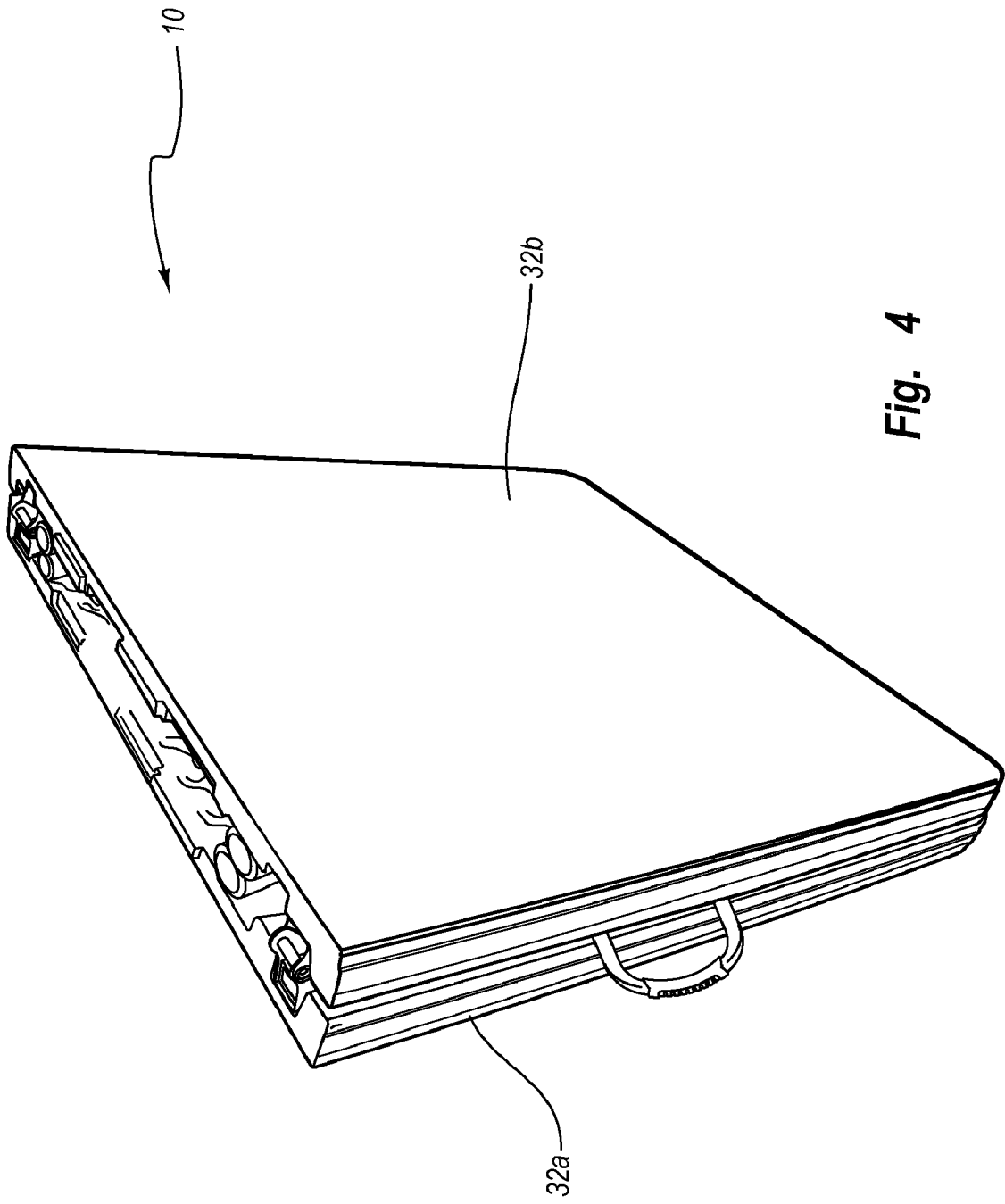

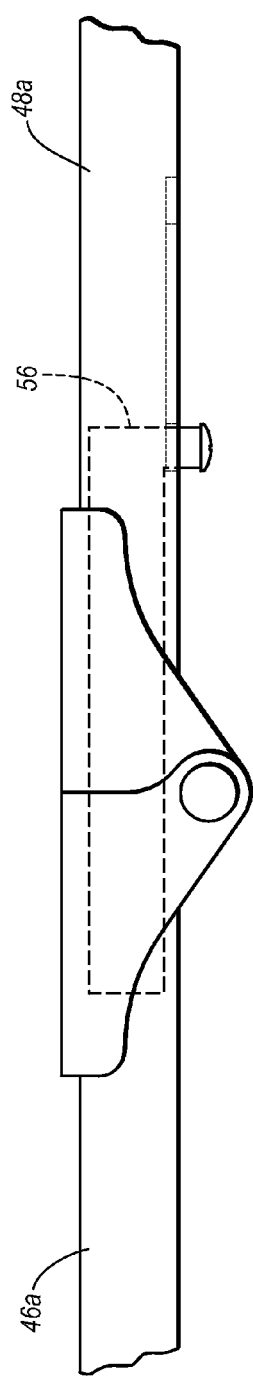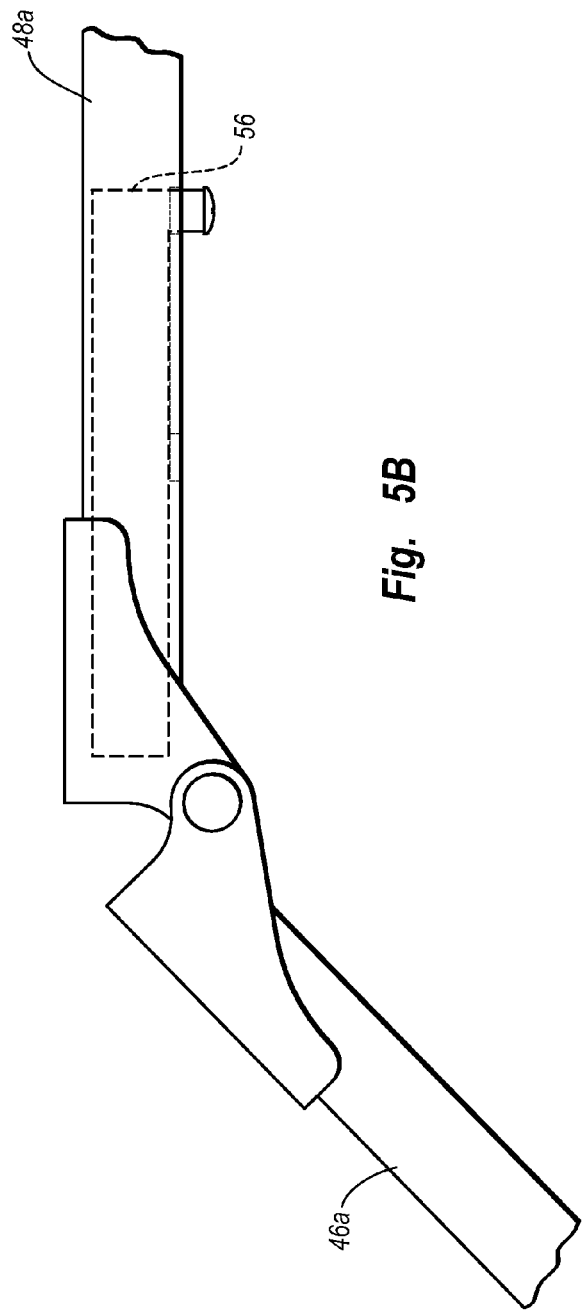

HANDLE FOR A PORTABLE TABLE

CROSS-REFERENCE TO RELATED APPLICATIONS

This application is a continuation of U.S. patent application Ser. No. 11/112,900, filed Apr. 22, 2005, now U.S. Pat. No. 7,735,431, and entitled HANDLE FOR A PORTABLE TABLE.

U.S. patent application Ser. No. 11/112,900, filed on Apr. 22, 2005, claims priority to and the benefit of U.S. provisional patent application Ser. No. 60/564,393, filed Apr. 22, 2004, and entitled FOLD-IN-HALF TABLE.

U.S. patent application Ser. No. 11/112,900, filed on Apr. 22, 2005, is a continuation-in-part of U.S. patent application Ser. No. 10/408,914, filed Apr. 8, 2003, now U.S. Pat. No. 7,096,799, and entitled PORTABLE FOLDABLE TABLE.

U.S. patent application Ser. No. 11/112,900, filed on Apr. 22, 2005, is also a continuation-in-part of U.S. utility patent application Ser. No. 10/843,037, filed May 10, 2004, now U.S. Pat. No. 7,640,870, and entitled PORTABLE FOLDING TABLE WITH LOCKING HINGE.

These applications and patents are each incorporated by reference in their entireties.

BACKGROUND OF THE INVENTION

1. Field of the Invention

The present invention generally relates to furniture and, in particular, to tables.

2. Description of Related Art

Many different types of tables are well known and used for a variety of different purposes. For example, conventional tables may include legs that are pivotally attached to a table top and the legs may be movable between a use position in which the legs extend outwardly from the table top and a storage position in which the legs are folded against the table top. Conventional tables with relatively large table tops and folding legs are often referred to as "banquet tables" and these tables are frequently used in assembly halls, banquet halls, convention centers, hotels, schools, churches and other locations where large groups of people meet. Because these conventional tables are generally easy to move and relatively portable, these types of tables can often be positioned in an assortment of different configurations and used in a variety of settings. When the tables are no longer needed, the table legs can be moved into the storage position and the tables may be moved or stored.

Conventional banquet tables with collapsible legs may allow the table to be more conveniently stored. The table top for many conventional banquet tables with collapsible legs, however, retains its size and shape. For example, many known banquet tables have a length between six to ten feet and a width between three to four feet. As a result, the storage of many conventional banquet tables, even with the legs in the collapsed position, may require a large storage area. This large storage area for each table may be problematic for large facilities such as hotels, schools and churches because a considerable number of these table may have to be stored. Thus, a big area may be required to store the tables. In addition, smaller facilities such as restaurants, offices and homes may use one or more conventional banquet tables. These smaller facilities may use the tables less frequently, such as during special occasions. Conventional banquet tables, even when the legs are folded, are often too bulky and obstructive to be conveniently used and stored at such smaller facilities. As a result, it is often necessary for both larger and smaller facilities to rent and/or borrow one or more banquet tables when needed. Disadvantageously, this process of renting and/or borrowing banquet tables can be inconvenient, time consuming and costly.

In addition, conventional banquet tables are often very difficult to move or transport from one location to another. For example, because of the length of many conventional banquet tables, the tables are often difficult to move by a single person. In addition, the extended length of the banquet tables may preclude the tables from being transported in the trunk or back seat of a typical passenger car. Accordingly, the banquet tables may have to be transported by a truck or trailer, which may be difficult to obtain, expensive and require a significant amount of time.

It is also known to construct tables that are capable of being folded-in-half. In particular, conventional fold-in-half tables typically include a table top with two sections that are pivotally connected by a hinge. The two sections of the table top may be moved between an unfolded position or use position in which the sections of the table top are generally aligned in the same plane and a folded position in which the two sections are positioned generally adjacent to each other for storage.

Disadvantageously, many known tables with foldable table tops are unstable and unable to support a significant amount of weight. For example, the connection of the two table top sections of many known fold-in-half tables may be relatively weak, which may allow, for example, a portion of the table top to sag. In order to construct a stronger table top, it is known to make foldable table tops out of stronger and thicker materials. Undesirably, this may increase the weight of the table top, which may make the table more difficult to carry and move.

Many conventional tables with foldable table tops also include hinges that connect the two portions of the table top and the hinges are often connected to the table top by a plurality of screws that are bored into the table top. Disadvantageously, the structural integrity of the table top may be decreased by the holes created by the plurality of screws, and this may allow the table to collapse and fail. In addition, because the screws are typically individually attached to the table top, this may significantly increase the amount of the time required to construct the table. Further, this may increase the manufacturing time and costs to make the table.

Additionally, known tables with foldable table tops are often difficult to transport and store because it may be hard to maintain the table top in the closed position, especially for a single person. In particular, the table tops of many known foldable tables can unintentionally swing between the folded and unfolded position while the tables are being moved, positioned and/or stacked. That is, while the table is being moved, the table top may inadvertently move from the folded to the unfolded position. If this occurs, the table may be undesirably dropped, and this may damage the table and/or injure the person carrying the table.

Further, when conventional fold-in-half tables are in the folded or storage position, it may be difficult to lift and move the table because it may be hard to grasp the table. In particular, the tables may be difficult to carry because there no convenient handholds or portions of the table to grab. In addition to many conventional fold-in-half tables being difficult to grasp and move in the folded position, this problem may be exasperated by the table top unintentionally unfolding while the table is being moved.

BRIEF SUMMARY OF THE INVENTION

A need therefore exists for a table that reduces or eliminates the above-described and other disadvantages and problems.

One aspect is a table that may include a table top and one or more legs or support pedestals that may be used to support the table top in a use or support position. The legs or support pedestals are preferably movable between an extended or use position and a collapsed or storage position relative to the table top. Advantageously, when the legs or support pedestals are in the use position, the table may be used to support a wide variety of objects and the table may be used for a variety of different purposes.

Another aspect is a table that may include a table top that is capable of being moved between a folded position and an unfolded position. Preferably, the table top includes two sections and the two sections are generally aligned in the same plane when the table top is in the unfolded position and the two sections are generally positioned adjacent to each other when the table top is in the folded position. The table may also include legs that are movable between a use position and a collapsed position. Advantageously, if the table includes both a foldable table top and foldable table legs that can be selectively moved between use and collapsed positions, then the table may be stored in a relatively compact area. This may allow, for example, a single person to easily move and transport the table. In addition, this may allow the table to be positioned in a relatively small area, such as the backseat or trunk of an automobile. Further, this may allow one or more tables to be shipped and/or stored in relatively small areas.

Yet another aspect is a table that may include a table top constructed from plastic and the plastic table top is preferably constructed using a blow-molding process. Advantageously, this may allow a lightweight table top to be easily constructed and it may allow the table top to be formed into various desired configurations, shapes, sizes and designs. This may also allow a table top to be constructed that is generally weather resistant and temperature insensitive, which may allow the table to be used in a wide variety of locations and environments. In addition, this may allow a table top that is durable, long-lasting and corrosion resistant to be constructed. Further, because a table top constructed from blow-molded plastic may be relatively strong, the table may be used to support a relatively large amount of weight. Significantly, a table top constructed from blow-molded plastic may also form a structural member of the table, but the table top may be supported by other structures, such as a frame.

Advantageously, a table top constructed from blow-molded plastic may be relatively strong because it includes opposing walls or surfaces that are separated by a distance. The opposing walls may help create a high-strength, rigid table top. In addition, because the interior portion of the table top may be generally hollow, that may create a lightweight table top. Thus, the blow-molded table top may be both lightweight and strong.

Still another aspect is a table that may include a table top that includes two sections. For example, the table top may include a first table top section and a second table top section, and each section may include an inner edge or portion. Desirably, the inner edges or portions of the first and second table top sections engage or contact when the table top is in the extended or use position, and the inner edges or portions are spaced apart from each other in the folded position. Advantageously, the inner edges or portions may be sized and configured to engage and/or overlap to allow, for example, a secure connection of the first and second sections when the table top is in the extended or use position. For instance, the inner edges or portions of the table top sections may include one or more projections and/or recesses that are sized and configured to contact or engage when the table top is in the extended or use position. In particular, the inner edges or portions may include tongue and groove portions which matingly engage when the table top is in the extended or use position. That is, the inner edge or portion of the first table top section may have one or more tongue and/or groove portions that are aligned with corresponding tongue and/or groove portions in the inner edge or portion of the second table top section. The table top sections are preferably configured so that the tongue and groove portions interlock when the table top is in the extended or use position. Advantageously, this may increase the strength and rigidity of the table top, which may allow the table top to be constructed of a lighter and/or thinner material without sacrificing strength or integrity.

A further aspect is a table that may include two sections that are movable between a folded and unfolded position, and the table may include a handle. Advantageously, this handle may allow the table to be more easily transported or moved. For example, the handle can be mounted to a portion of the table top such that the handle may project between the edges of the table top sections when the table top is in the folded position. In this configuration, a single individual may easily gasp the projecting handle to carry the table. The table may also include a handle retention assembly that may be used to secure the handle in a desired position. In particular, the handle retention assembly may advantageously secure the handle in a generally fixed position. For instance, the handle retention assembly may secure the handle in a generally fixed position that is out of the way and not obstructive when the table top is in the unfolded position.

Another aspect is that the table may be easily assembled and/or disassembled. For example, the table may not include any heavy or complex mechanisms to attach the table legs to the table top and/or to connect the first and second sections of the table top. In particular, the table may include a frame that quickly and easily attaches the legs to the table top. For instance, the frame may include two elongated side rails and the side rails may be connected to one or more frame mounting portions. Advantageously, the frame mounting portions may be integrally formed in the table top and the frame can be attached to the table top by a snap, friction or interference fit. Significantly, this may allow the frame to be attached to the table top without mechanical fasteners such as screws or bolts, but mechanical fasteners may be used if desired. Because mechanical fasteners are not required to attach the frame to the table top, fewer parts may be required to assemble the table and holes do not have to be formed in the table top. This may also allow the table to be quickly and easily manufactured and assembled. Further, fewer workers may be required to assemble the table and the relatively straight forward design and attachment of the frame to the table top may allow the table to be shipped either assembled or unassembled, which may allow retailers or consumers to assemble the table if desired.

Still another aspect is a table that may include a table top with sections that are interconnected. For example, a frame may be attached to the sections of the table top and the frame may be sized and configured to allow the table top to be moved between the folded and unfolded positions. In particular, the frame may include side rails that are connected to the sections of the table top and one or more hinge assemblies may be connected to the side rails. The hinge assemblies may enable the table top to move between the folded and unfolded positions. Preferably, the hinge assemblies are mounted directly to the frame and the hinge assemblies are not connected to the table top. Because mechanical fasteners are not required to attach the hinge assemblies to the table top, fewer parts may be required to assemble the table and holes do not have to be formed in the table top, which may allow the table to be quickly and easily manufactured and assembled. Because the hinge assemblies do not have to be separately mounted directly to the table top by screws or other fasteners, this may allow retailers or consumers to assemble the table if desired.

Still yet another aspect is a table that may include a table top with sections that are interconnected by one or more hinge assemblies to allow the table top to be moved between folded and unfolded positions. The table preferably includes a mechanism, such as a bolt, that is slidable or movable relative to the table top between a first position and a second position. For example, when the table top is in the unfolded position, the bolt may be sized and configured to lock a hinge assembly and/or a portion of the frame in a generally fixed position to secure the table top in the unfolded position. The bolt may also be moved to unlock the hinge assembly and/or the frame to allow the table top to be moved into the folded position. Advantageously, the bolt may secure the table top in the unfolded position and prevent the table from unintentionally folding.

A further aspect is a table that may include one or more legs that are movable between an extended position and a collapsed position relative to the table top. The legs may be connected to a cross member and the cross member may be connected to the frame.

A still further aspect is a table that may include a retainer which may be connected to a first portion of the table top. Advantageously, the retainer may be sized and configured to secure the table top in a closed or folded position. For example, the retainer may include a first end that is connected to a first portion of the table top, such as a cross member or a portion of the frame. The second end of the retainer may be sized and configured to be attached to a second portion of the table top when the table top is in the closed or folded position. In particular, the second end of the retainer may be connected to a cross member or a portion of the frame. Preferably, the second end of the retainer is selectively connected to the second portion of the table top to allow the table top to be folded and unfolded. Significantly, the retainer may help retain the table top in the folded position so that the table top does not unintentionally unfold when the folded table is being carried, transported and/or stored. The retainer may also be sized and configured to automatically engage the second portion of the table top, which may simplify the engagement process. In addition, the retainer may be selectively connected to the first portion of the table top, which may simply the manufacturing process and allow the retainer to be quickly and easily attached.

Yet still another aspect is a table that may include a brace that is connected to one or more of the legs. In particular, the brace may include a first end that is connected to the table top and a second end that is connected to the leg. The brace is preferably sized and configured to support the leg in an extended position relative to the table top. The brace, which may be any suitable type of brace such as a slotted brace, may be biased to secure the leg in the extended position. For example, the brace may include a pin that is disposed within a slot and the brace may include a biasing member, such as a spacer or washer. The biasing member may be constructed from a deformable and resilient material, such as rubber, which may be used to bias the brace into a desired position. For example, the brace may be biased to lock the brace in a generally fixed position, which may secure the leg in the extended position.

These and other aspects, features and advantages of the present invention will become more fully apparent from the following detailed description of preferred embodiments and appended claims.

BRIEF DESCRIPTION OF THE DRAWINGS

The appended drawings contain figures of preferred embodiments to further illustrate and clarify the above and other aspects, advantages and features of the invention. It will be appreciated that the drawings depict only preferred embodiments of the invention and are not intended to limits its scope. The invention will be described and explained with additional specificity and detail through the use of the accompanying drawings in which:

FIG. 4 is still another perspective view of the table shown in FIG. 1, illustrating the table top is a fully folded position and the legs in the collapsed or folded position;

FIG. 5A is a side view of a portion of the table shown in FIG. 1, illustrating an exemplary portion of the table frame, hinge assembly and locking mechanism in a locked position;

FIG. 5B is another side view of the portion of the table shown in FIG. 5A, illustrating the portion of the table frame, hinge assembly and locking mechanism in an unlocked and partially folded position;

DETAILED DESCRIPTION OF THE PREFERRED EMBODIMENTS

The present invention is generally directed towards a table that includes a table top that are capable of being folded in half. The principles of the present invention, however, are not limited to a table with a table top that is capable of being folded in half. It will be understood that, in light of the present disclosure, the tables and various portions of the tables disclosed herein can be successfully used in connection with other types of furniture and structures.

Additionally, to assist in the description of the tables, words such as top, bottom, front, rear, right and left are used to describe the accompanying figures. It will be appreciated, however, that the tables can be located in a variety of desired positions and the tables can have various suitable shapes, sizes and configurations. A detailed description of exemplary embodiments of the table now follows.

Figure 1:
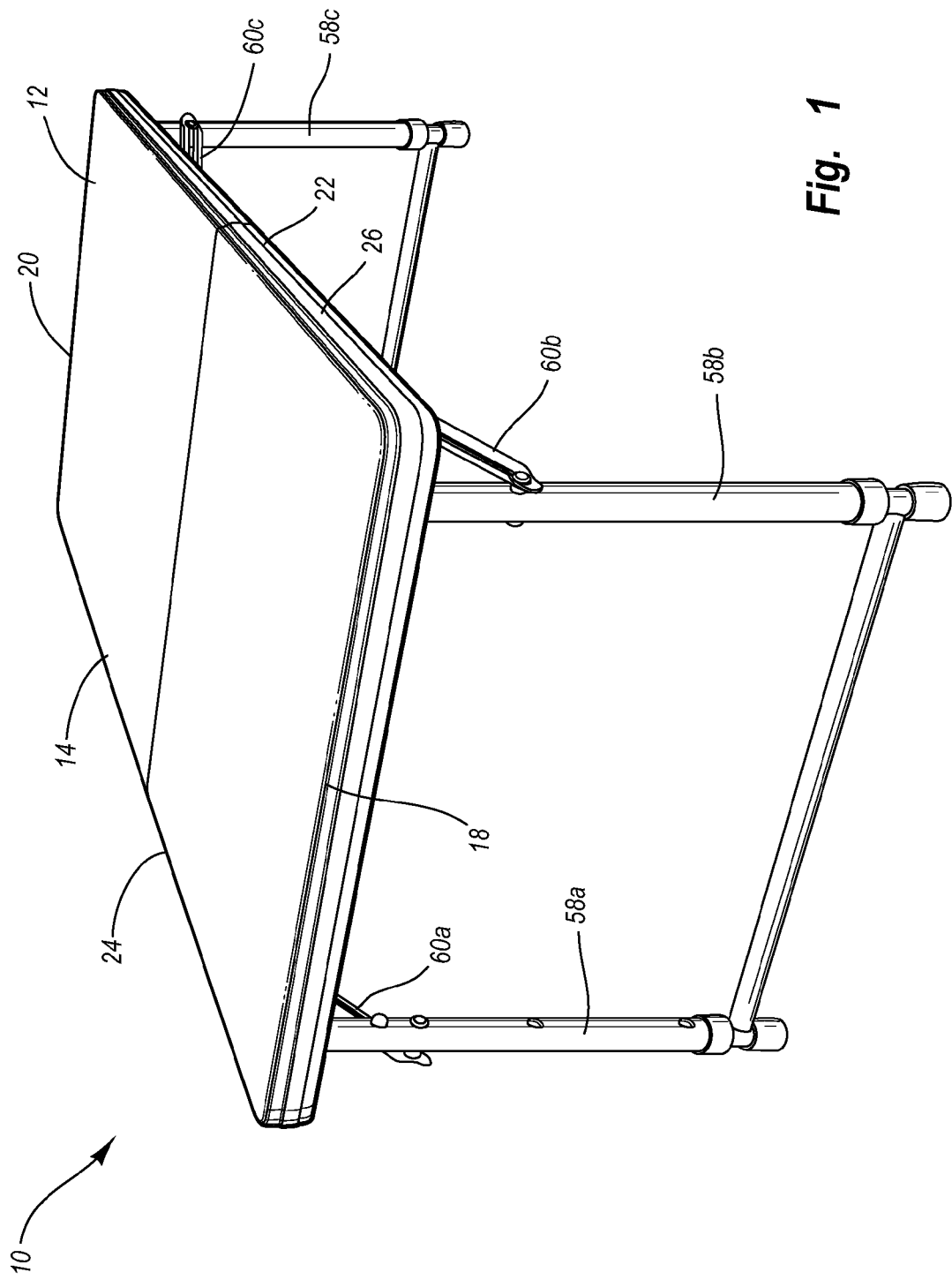
FIG. 1 is an upper perspective view of a table in accordance with an exemplary embodiment of the present invention, illustrating the legs in an extended position.
Figure 2:
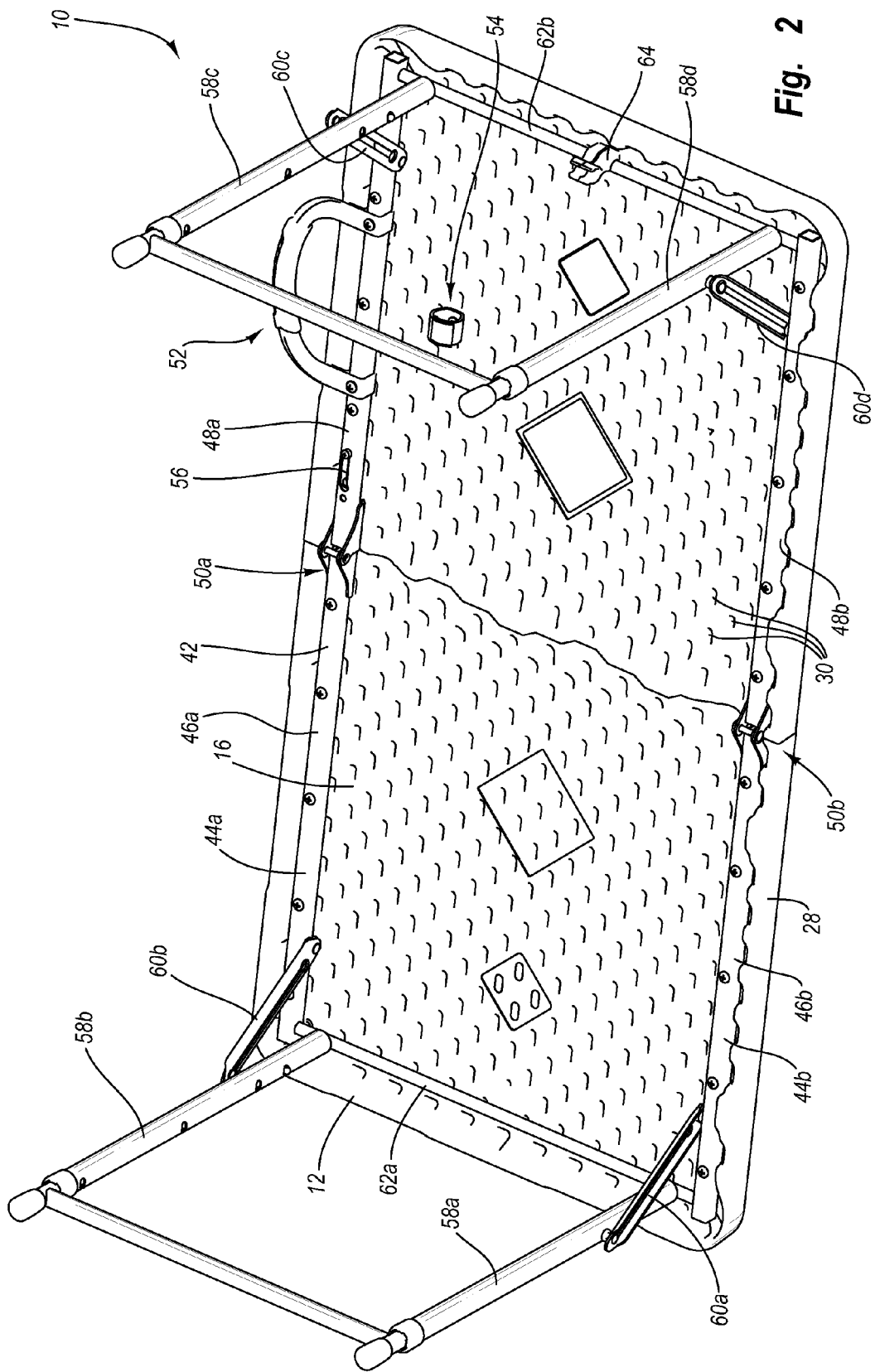
FIG. 2 is a lower perspective view of table shown in FIG. 1, illustrating the legs in an extended position.

As shown in FIGS. 1 and 2, an exemplary embodiment of a table 10 includes a table top 12 with an upper surface 14, a lower surface 16, a first end 18, a second end 20, a front side 22 and a rear side 24. The upper surface 14 of the table top 12 is preferably generally planar to create a relatively smooth and flat working surface, but the upper surface could also be textured and have other suitable shapes and configurations depending, for example, upon the intended use of the table 10. The table top 12 may also include an outer edge 26 that is disposed about a perimeter or periphery of the table top. All or a portion of the outer edge 26 of the table top 12 may be beveled, sloped, rounded and the like according to, for example, the intended design and/or aesthetics of the table 10.

The table top 12 may also include a generally downwardly extending lip 28 that is disposed near or at the outer edge 26 of the table top. The lip 28 preferably extends downwardly beyond the lower surface 16 of the table top 12 and the lip may be aligned with and/or form a part of the outer edge 26 of the table top. It will be appreciated that all or a portion of the lip 28 may also be spaced inwardly from the outer edge 26 of the table top 12. As discussed below, the lip 28 may be integrally formed with the table top 12 as part of a unitary, one-piece structure. The lip 28, however, does not have to be integrally formed as part of the table top 12 and the table 10 does not require the lip 28.

As shown in the accompanying figures, the table top 12 preferably has a generally rectangular configuration with rounded corners and slightly rounded edges 26. Desirably, the table top 12 has a relatively large size and it may be configured for use as a banquet, conference or utility table. In particular, the table top 12 may have a length of about five feet (about 1.5 meters) and a width of about two and one-half feet (about 0.75 meters). One of ordinary skill in the art will appreciate that the table top 12 can be larger or smaller according, for example, to the intended use of the table 10. Additionally, the table top 12 may have other suitable shapes and configurations such as square, circular, oval and the like depending, for example, upon the intended use of the table 10. In addition, the corners and edges 26 of the table top 12 do not have to be rounded and, in contrast, the corners and edges could have any desirable configuration. Further, the table top 12 could be sized and configured for use with other types of tables such as card tables, personal-sized tables, and the like.

The table top 12 is preferably constructed from a lightweight material and, more preferably, the table top is constructed from plastic, such as high density polyethylene. The plastic table top 12 is desirably formed by a blow-molding process because, for example, it may allow a strong, lightweight, rigid and sturdy table top to be quickly and easily manufactured. Advantageously, the blow-molded plastic table top 12 may be lightweight because it may include a hollow interior portion that is formed during the blow-molding process. It will be appreciated, however, that the table top 12 does not have to be formed with a hollow interior portion and the hollow interior portion can be filled, for example, with a material such as foam after the table top is formed.

The table top 12 is preferably constructed from blow-molded plastic because blow-molded plastic table tops are relatively durable, weather resistant, temperature insensitive, corrosion resistant, rust resistant and blow-molded plastic generally does not deteriorate over time. One of ordinary skill in the art, however, will appreciate that the table top 12 does not have to be constructed from blow-molded plastic and other suitable materials can be used to construct the table top such as other types of plastics, polymers and synthetic materials. In addition, the table top 12 may be constructed from other materials with desirable characteristics such as wood, metal, fiberglass, ceramics, graphite and the like. Further, other types of processes may be used to construct the table top 12 such as injection molding, rotary molding and the like.

The upper surface 14 of the table top 12 is preferably generally spaced apart from the lower surface 16 by a given distance and these two spaced apart surfaces may help create a rigid and strong table top. Preferably, the upper surface 14 and the lower surface 16 of the table top 12 are separated by a generally constant distance so that the surfaces are generally aligned in parallel planes. The upper surface 14 and the lower surface 16, however, do not have to be spaced apart by a generally constant distance and, in fact, the upper and lower surfaces could be separated by any desired distance.

The table top 12 may also include one or more structures or features that may be sized and configured, for example, to increase the strength and rigidity of the table top. In particular, the table top 12 may include one or more depressions 30, which are also known as tack-offs or kiss-offs, that are sized and configured to increase the strength and rigidity of the table top. Advantageously, the depressions 30 and/or other reinforcement structures may be integrally formed as part of a unitary one-piece table top 12, such as during the blow-molding or other molding processes, but the depressions and other structures can also be formed independently and/or attached separately of the table top.

As shown in FIG. 2, the depressions 30 are preferably located in the lower surface 16 of table top 12 and the depressions are preferably sized and configured to increase the strength and structural integrity of the table top 12. The depressions 30 preferably extend towards the upper surface 14 of the table top 12 and the ends of the depressions 30 may contact or engage the inner portion of the upper surface of the table top. On the other hand, the ends of the depressions 30 may be spaced part from the inner portion of the upper surface 14 of the table top 12.

The depressions 30 preferably cover substantially the entire lower surface 16 of the table top 12, but it will be appreciated that the depressions may cover only a portion of the table top. Additionally, while the depressions 30 are shown and described as being located in the lower surface 16 of the table top 12, it will be appreciated that the depressions could be formed in any desired portion of the table top. For example, it will be appreciated that one or more depressions 30 may be formed in the upper surface 14 of the table top 12 and one or more depressions may be formed in the lower surface 16 of the table top 12, and these opposing depressions may be generally aligned. At least a portion of these opposing depressions 30 may contact or engage each other, but the opposing depressions do not have to touch or engage.

The depressions 30 are preferably also arranged into a predetermined pattern or array in order to increase the strength and structural integrity of the table top 12. In particular, the depressions 30 are preferably spaced closely together in a predetermined pattern such that the distance between the depressions is minimized. For example, minimizing the distance between the depressions 30 formed in the lower surface 16 of the table top 12 may diminish the unsupported areas of the upper surface 14 of the table top, which may increase the smoothness of the upper surface of the table top. In addition, minimizing the distance between the depressions 30 may increase the structural integrity and strength of the table top 12. Thus, the depressions 30 may be desirably closely spaced on the lower surface 16 of the table top 12 such that the depressions are separated by a minimum distance in order to create a table top with greater strength, improved structural integrity and an upper surface 14 with increased smoothness.

In addition, the depressions 30 are preferably arranged in a predetermined pattern with a generally constant and uniform spacing so that the table top 12 has generally uniform characteristics. In particular, the depressions 30 are preferably arranged into a generally uniform pattern across at least a majority of the lower surface 16 of the table top 12 so that the strength, structural integrity and/or other characteristics of the table top are generally uniform throughout the table top. Thus, the table top 12 has fewer, if any, weak or unsupported portions which may decrease the strength and structural integrity of the table top. Thus, the depressions 30 may be used to create a table top 12 with generally uniform characteristics. It will be appreciated that the depressions 30 may also have a non-uniform spacing depending, for example, upon various features that are formed in the table top 12 or upon the intended use of the table 10. It may be desirable, however, for these various features that are formed in the table top 12 to be sized and configured such that they do not significantly disturb or disrupt the generally uniform pattern of depressions 30.

Advantageously, the increased structural integrity and strength of the table top 12 may allow the outer wall thickness of the table top to be decreased, which may allow the table top to be constructed with less material. For example, if the table top 12 is constructed from blow-molded plastic and the outer wall thickness is reduced, then less plastic may be used to construct the table top. Because less plastic may be used to construct the table top 12, that may allow the cost of the table 10 to be decreased. In addition, the table top 12 may cool more quickly during the manufacturing process because of the decreased outer wall thickness. This may allow the table top 12 to be removed from the manufacturing mold more quickly and it may allow the table top to be removed at a higher temperature because the thinner outer wall may dissipate heat more rapidly. Significantly, because the cycle time required to construct the table top 12 may be decreased, the manufacturing efficiency may be increased.

Additional details regarding the size, shape and configuration of one or more depressions that may be suitable for use in connection with the table top 12 are disclosed in Assignee's U.S. patent application Ser. No. 10/409,000, which was filed Apr. 8, 2003, entitled HIGH-STRENGTH, LIGHTWEIGHT BLOW-MOLDED PLASTIC STRUCTURES, now U.S. Pat. No. 7,069,865, which is incorporated by reference in its entirety. While the table top 12 preferably includes one or more depressions, it will be appreciated that the table top does not require any depressions or other reinforcing structures.

As discussed above and as shown in FIG. 2, the lip 28 is preferably disposed about the outer periphery of the table top 12 and it is generally aligned with the outer edge 26. The lip 28 may include an inner portion, and outer portion and a lower surface. Preferably, the outer portion of the lip 28 is generally aligned with the outer edge 26, but the lip could also be spaced inwardly from the outer edge of the table top. The lip 28 may also include a hollow interior and the lip may be integrally formed during the blow-molding process as part of table top 12. It will be appreciated, however, that the lip 28 does not have to be formed as a unitary component of the table top 12 and the table top does not require the lip.

The lower surface of the lip 28 is preferably sized and configured to facilitate stacking of the table 10. For example, the lower surface of the lip 28 may have a generally smooth, planar configuration to facilitate stacking of the table 10. In addition, the inner portion of the lip 28 may include a number of serrations, notches, ribs, struts and the like that are sized and configured to increase the strength, rigidity and/or flexibility of the lip 28. In particular, the inner portion of the lip 28 may include a number of notches, indentations, grooves or other inwardly extending portions to form at least a portion of an uneven or saw-tooth type surface. The inner portion of the lip 28 may also include a number of bumps, humps, protrusions or other outwardly extending portions to form at least a portion of an uneven or saw-tooth type surface. The inner portion of the lip 28 may also contain a combination of inwardly and outwardly portions to form at least a portion of the uneven or saw-tooth type surface. Other suitable configurations of the lip 28 and other portion of the table 12 are disclosed in Assignee's U.S. patent application Ser. No. 10/409,273, which was filed Apr. 8, 2003, entitled EDGE AND CORNER FOR A TABLE TOP, now U.S. Pat. No. 7,111,563; and Assignee's U.S. patent application Ser. No. 11/051,933, which was filed on Feb. 4, 2005, entitled EDGE AND CORNER FOR A STRUCTURE CONSTRUCTED FROM BLOW-MOLDED PLASTIC, now U.S. Pat. No. 7,475,643; each of which are incorporated by references in their entirety.

It will also be understood that other features of the table top 12 may also be integrally formed with table top 12 as part of a unitary, one-piece structure. For example, various mounting portions, receiving portions and the like may be integrally formed as part of the table top 12. Because these features may be integrally formed as part of the table top 12, that may expedite the manufacturing process. These features, however, do not have to be integrally formed in the table top 12 and they could be attached to the table top by any suitable methods or devices.

Figure 3:
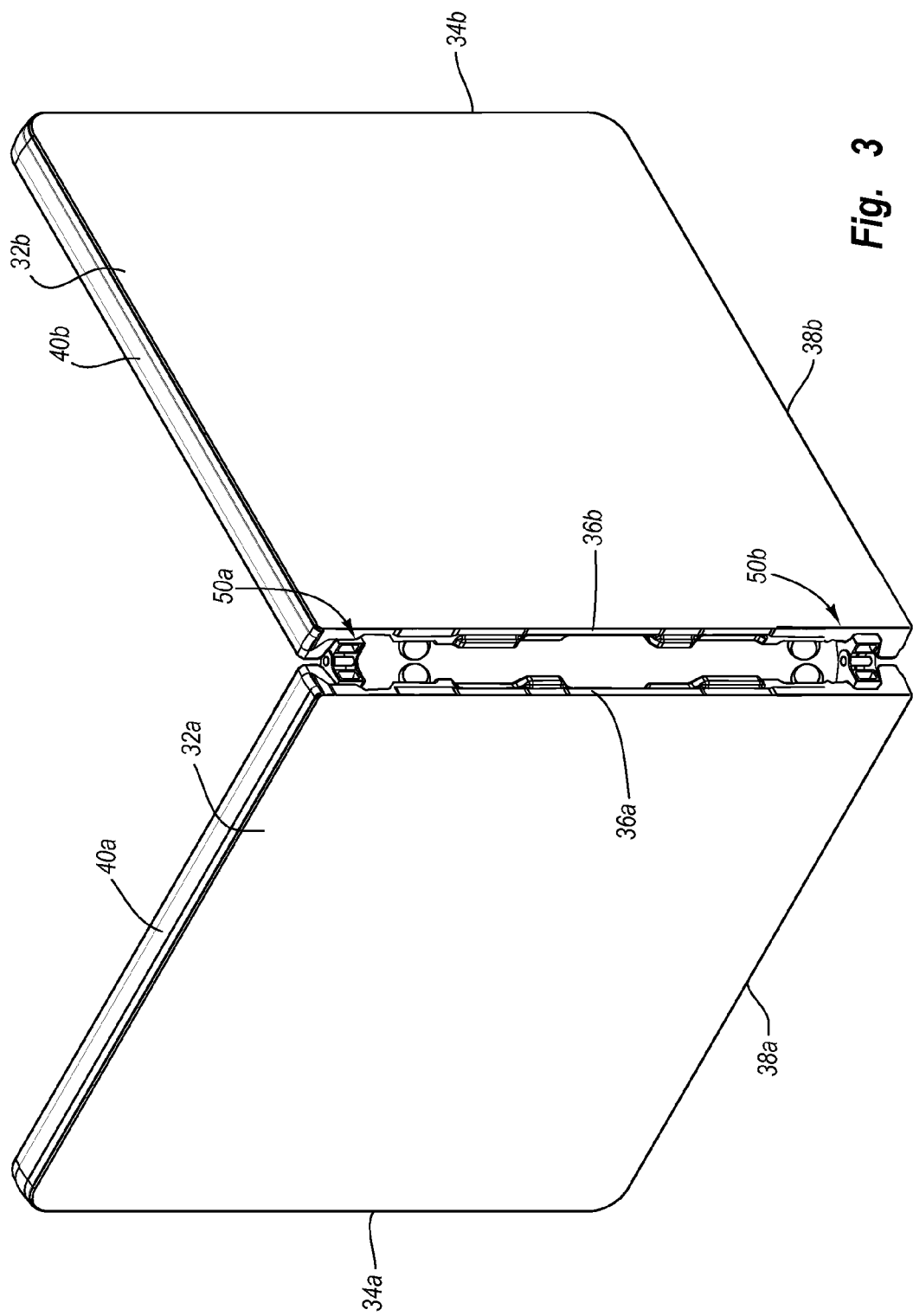
FIG. 3 is another perspective view of the table shown in FIG. 1, illustrating the table top in a partially folded position and the legs in a collapsed or folded position.

As seen in FIG. 3, the table top 12 may include one or more table top sections 32, such as a first table top section 32*a* and a second table top section 32*b*. The table top sections 32*a*, 32*b* may include outer edges 34*a*, 34*b*; inner edges 36*a*, 36*b*; and opposing side edges 38*a*, 38*b* and 40*a*, 40*b* respectively. It will be appreciated that the table top 12 can include any suitable number of sections 32 and the table top 12 may also be constructed as a single, one-piece structure. Advantageously, the first table top section 32*a* and the second table top section 32*b* may be moved between a folded position as shown in FIG. 4 and an unfolded position as shown in FIG. 1. When the table top 12 is in the folded position, the table 10 may be more easily transported and/or stored.

The inner edges 36*a*, 36*b* of the table top sections 32*a*, 32*b* preferably contact, abut and/or are positioned adjacent to each other when the table top 12 is in the folded position. Significantly, the inner edges 36*a*, 36*b* of the table top sections 32*a*, 32*b* may be sized and configured to increase the strength and/or rigidity of the table top 12. In particular, the inner edges 36*a*, 36*b* of the table top sections 32*a*, 32*b* may include one or more portions that overlap, interlock and/or engage to increase the strength and/or rigidity of the table top 12. In greater detail, the inner edges 36*a*, 36*b* may include corresponding inwardly and outwardly extending portions that are sized and configured to contact, interlock and/or engage with the table top 12 is in the folded position. For example, as shown in FIG. 3, the inner edges 36*a*, 36*b* may each include an upper portion and a lower portion. The upper portions of the inner edges 36*a*, 36*b* may include generally planar surface that are sized and configured to abut and/or be positioned adjacent to each other when the table top 12 is in the unfolded position. The lower portions of the inner edges 36*a*, 36*b* may include one or more receiving portions, such as grooves or recesses, and one or more outwardly extending portions, such as extensions or flanges. The outwardly extending portions are preferably sized and configured to be at least partially received in the receiving portions when the table is in the unfolded position.

When the table 10 is being moved from the folded position to the unfolded position, the outwardly extending portions may be disposed in the receiving portions to, for example, interlock the table top sections 32*a*, 32*b*. This interlocking of the table top sections 32*a*, 32*b* may increase the strength and/or rigidity of the portion of the table top 12 along the inner edges 36a, 36b. Advantageously, this may help create a table top 12 with a smoother upper surface 14 and it may help prevent unwanted bending of the table top along the inner edges 36a, 36b. It will be appreciated that the outwardly extending portions and the receiving portions can have a variety of different sizes, shapes and configurations. It will also be appreciated that the table top 12 does not require outwardly extending portions and/or the receiving portions.

As best seen in FIG. 2, the table 10 may include a frame 42 and the frame may be sized and configured to increase the strength and/or rigidity of the table top 12, but the frame is not required. As discussed below, the frame 42 may also be used to attach the legs to the table top 12. As shown in the accompanying figures, the frame 42 may be connected to the lower surface 16 of the table top 12 and the frame may include two side rails 44a, 44b that are disposed proximate the outer edges of the table top. The side rails 44a, 44b preferably extend along all or at least a substantial portion of the length of the table top 12, but the side rails could have any suitable length and configuration. For example, while the side rails 44a, 44b are preferably disposed proximate the lip 28, the side rails may be disposed in any suitable location. It will be appreciated that while the frame 42 preferably includes side rails 44a, 44b, the frame could have other suitable configurations and arrangements, and the table 10 does not require a frame.

The frame 42 is desirably constructed from metal, which may easily be formed into the desired configuration by known operations, such as stamping and bending, and the metal may be coated or painted as desired. The frame 42 may be connected to the table top 12 be one or more fasteners, such as bolts or screws. The frame 42 may also be attached to the table top 12 without mechanical fasteners, such as disclosed in Assignee's U.S. patent application Ser. No. 10/409,259, which was filed on Apr. 8, 2003, entitled FRAME THAT CAN BE ATTACHED TO A TABLE TOP WITHOUT MECHANICAL FASTENERS, now U.S. Pat. No. 7,178,471, which is incorporated by reference in its entirety.

As best seen in FIG. 2, the side rails 44a, 44b of the frame 42 are preferably connected to the first and second table top sections 32a, 32b of the table top 12. For example, the side rails 44a, 44a may include first portions 46a, 46b that are connected to the first table top section 32a, and second portions 48a, 48b that are connected to the second table top section 32b.

The first and second table top sections 32a, 32b are preferably pivotally connected to allow the table top 12 to be moved between the folded and unfolded positions. For example, one or more hinge assemblies may be used to pivotally connect the first and second table top sections 32a, 342b. In particular, as shown in the accompanying drawings, a first hinge assembly 50a may be connected to the first side rail 44a and a second hinge assembly 50b may be connected to the second side rail 44b. The hinge assemblies 50a, 50b may include a first portion that is connected to the first portions 46a, 46b of the side rails 44a, 44b and a second portion that is connected to the second portions 48a, 48b of the side rails. The hinge assemblies 50a, 50b may include a hinge member, such as a pin, bolt, rod or the like, that allows the hinge assemblies to pivot about an axis. The hinge assemblies 50a, 50b are preferably connected to the side rails 44a, 44b by welding, adhesives, mechanical fasteners and the like. It will be appreciated that the hinge assemblies 50a, 50b can also be at least partially integrally formed as part of the frame 42. In addition, it will be appreciated that the hinge assemblies 50a, 50b can be connected to any suitable portions of the table 10 and the hinge assemblies can have any suitable arrangement and configuration that allows the first and second table top sections 32a, 32 to be selectively moved between the folded and unfolded positions.

The table 10 may include a handle 52 that may be sized and configured to facilitate lifting and moving the table. For example, as shown in FIG. 2, the handle 52 may be mounted to a portion of the table top 12 and the handle may project between the edges of the table top sections 32a, 32b when the table top is in the folded position (as shown in FIG. 4). In this configuration, a single individual can easily gasp the projecting handle 52 to carry the table 10. The table 10 may also include a handle retention assembly 54 that may advantageously secure the handle 52 in a generally fixed position. Desirably, the handle retention assembly 54 secures the handle 52 in an out of the way location, such as to the lower surface 16 of the table top, when the table 10 is in the unfolded position. The handle 52 and the handle retention assembly 54 are discussed in greater detail below.

The table 10 may also include a locking mechanism that is sized and configured to lock the table in a desired position. For example, the locking mechanism may be used to secure the table top 12 in the unfolded position. In particular, as shown in FIG. 2, the locking mechanism may include a bolt 56 that is slidable or otherwise movable relative to the table top 12. The bolt 56, when the table top 12 is in the unfolded position, may be designed to selectively lock the hinge assembly 50 and/or the table frame 42 in a generally fixed position. Accordingly, the locking mechanism may lock the table top 12 in a secure and stable position, and the table 10 can be easily moved without the risk of the table 12 unintentionally folding. In greater detail, as shown in FIG. 5A, the bolt 56 may secure the side rail portions 46a, 48a in a generally fixed position. On the other hand, as shown in FIG. 5B, the bolt 56 may be moved to allow the side rail portions 46a, 48a to be freely moved. Other suitable embodiments for a locking mechanism that may be used to secure the table 10 in the unfolded position are disclosed in Assignee's U.S. patent application Ser. No. 11/112,810, filed Apr. 22, 2005, entitled LOCKING MECHANISM FOR A FOLD-IN-HALF TABLE, now abandoned, which is incorporated by reference in its entirety.

As discussed above, the table 10 may include one or more legs 58 and the legs are preferably movable between an extended or use position and a collapsed or storage position relative to the table top 12. Preferably, the legs 58 are positioned adjacent or proximate the lower surface 16 of the table top 12 in the collapsed or storage position to facilitate stacking, storage and/or shipping of the table. In addition, the legs 58 are preferably positioned adjacent or proximate the lower surface 16 of the table top 12 to allow the table top 10 to be positioned in a folded position such that the first table top section 32a is positioned adjacent or proximate the second table top section 32b.

For example, as shown in FIG. 2, the table 10 may include four legs 58a, 58b, 58c, 58d and one or more of the legs may be interconnected. The legs 58a, 58b, 58c, 58d are preferably sized and configured to support the table top 12 above a surface such as a floor, and the legs may be adjustable in length. It will be appreciated, however, that the legs 58 could be independently connected to the table 10 and the legs do not have to be adjustable in length. It will also be appreciated that the legs 58a, 58b, 58c, 58d may be connected to the table top 12 in any suitable manner. For example, the legs 58a, 58b, 58c, 58d may be connected to connecting rods 62 and the connecting rods may be connected to the frame 42. In particular, the ends of the connecting rods 62 may be disposed within openings in the side rails 44 of the frame 42 to allow the legs 58a, 58b, 58c, 58d to be attached to the table top 12.

The connecting rods 62 and the legs 58 are desirably constructed from hollow metal tubes because the metal tubes are relatively lightweight and strong. The hollow metal tubes forming the connecting rods 62 and legs 58 may have a generally oval configuration to provide increased strength. Advantageously, the oval configuration may also be used to create a thinner profile for the legs 58, which may create a thinner profile for the table 10 when the legs 58 are in the collapsed position.

It will be appreciated that the legs 58 may be constructed from other materials with the suitable characteristics and the legs 58 may have other shapes and configurations depending, for example, upon the intended use of the table 10. For example, the legs 58 may include only a single elongated support member or multiple elongated support members, and the legs 58 may be constructed as a single component or multiple components that are connected together. It will further be appreciated that the legs 58 need not be in pivotal engagement with frame 42 or the table top 12 to be collapsible. For example, the legs 58 may be detachably connected to the table top 12 such that when it is desired to collapse the table 10 for storage, the legs 58 are detached from the table top 12. Other suitable arrangements and configurations for attaching the legs 58 to the table 10 are disclosed in Assignee's U.S. patent application Ser. No. 10/408,917, filed Apr. 8, 2003, entitled PIVOTAL CONNECTION OF A TABLE LEG TO A FRAME, now U.S. Pat. No. 7,100,518, which is incorporated by reference in its entirety.

As shown in FIGS. 1 and 2, one or more braces 60 may be used in connection with the legs 58. For example, a brace 60a, 60b, 60c, 60d may be attached to the legs 58a, 58b, 58c, 58d, respectively, and the braces may be used to secure the legs in the extended position. The braces 60 may be a slotted brace in which a pin is disposed within an elongated slot. The braces 60 may also include a biasing member, such as a spacer or washer, which is preferably constructed from a deformable and resilient material, such as rubber, which may be used to bias the brace into a desired position. For example, the biasing member may be used to bias the brace 60 into a locked position, which may be used to lock the leg 58 in the extended position. Other suitable types of braces and mechanisms that may be used in connection with the table 10 are disclosed in Assignee's U.S. patent application Ser. No. 11/112,236, filed Apr. 22, 2005, entitled BRACE ASSEMBLY FOR A TABLE, now abandoned, which is incorporated by reference in its entirety.

As shown in FIG. 2, the table 10 may include a retainer 64 that may be sized and configured to secure the table in the folded position. For example, as shown in the accompanying figures, the retainer 64 may be connected to a first portion of the table 10, such as the first table top section 32a. In particular, the retainer 64 may be connected to a portion of the frame 42, such as the connecting rod 62b. The retainer 64 is preferably sized and configured to be connected to a second portion of the table 10, such as the second table top section 32b, when the table is in the folded position. In greater detail, the retainer 64 is preferably sized and configured to be connected to a portion of the frame 42, such as the connecting rod 62a, when the table top 12 is in the folded position.

Advantageously, the retainer 64 may retain the table 10 in the folded position so that the table does not unintentionally unfold when the folded table is being carried, transported and/or stored. In addition, the retainer 64 may be sized and configured to automatically engage the other portion of the table top 12 to simplify the engagement process. The retainer 64 may also be quickly and easily connected to the connecting rods 62a and/or 62b, which may simplify the manufacturing process and allow the retainer to be used in a wide variety of situations and environments. Additionally, the retainer 64 may be connected to suitable portions of the table top 12 to secure the retainer in a fixed position. Significantly, because the retainer 64 may be connected to the table top 12 and/or the connecting rods 62a, 62b by a snap, friction or interference fit, the retainer may be easy to use and mechanical fasteners may not be required. It will be appreciated, however, that the retainer 64 may be connected to the table 10 by mechanical fasteners, adhesives, and the like, and the retainer can be attached to any suitable portions of the table.

Desirably, one portion of the retainer 64 is securely connected to a first portion of the table top 12, such as the connecting rod 62b, so that the retainer is permanently connected or not easily removed from that portion of the table top. The other portion of the retainer 64 is preferably selectively connected to another portion of the table top 12, such as the connecting rod 62a, so that the retainer may be quickly and easily attached and detached. This may allow the retainer 64 to quickly and easily secure the table top 12 in the folded position, and allow the table top to be quickly and easily moved into the unfolded position. It will be appreciated that either or both portions of the retainer 64 may be selectively or permanently connected to suitable portions of the table top 12 depending, for example, upon the design and/or intended use of the table 10. Other suitable types of retainers that may be used in connection with the table 10 are disclosed in Assignee's U.S. patent application Ser. No. 11/112,075, filed Apr. 22, 2005, entitled RETAINER FOR SECURING A TABLE IN A FOLDED POSITION, now U.S. Pat. No. 7,634,969, which is incorporated by reference in its entirety.

Figure 6:
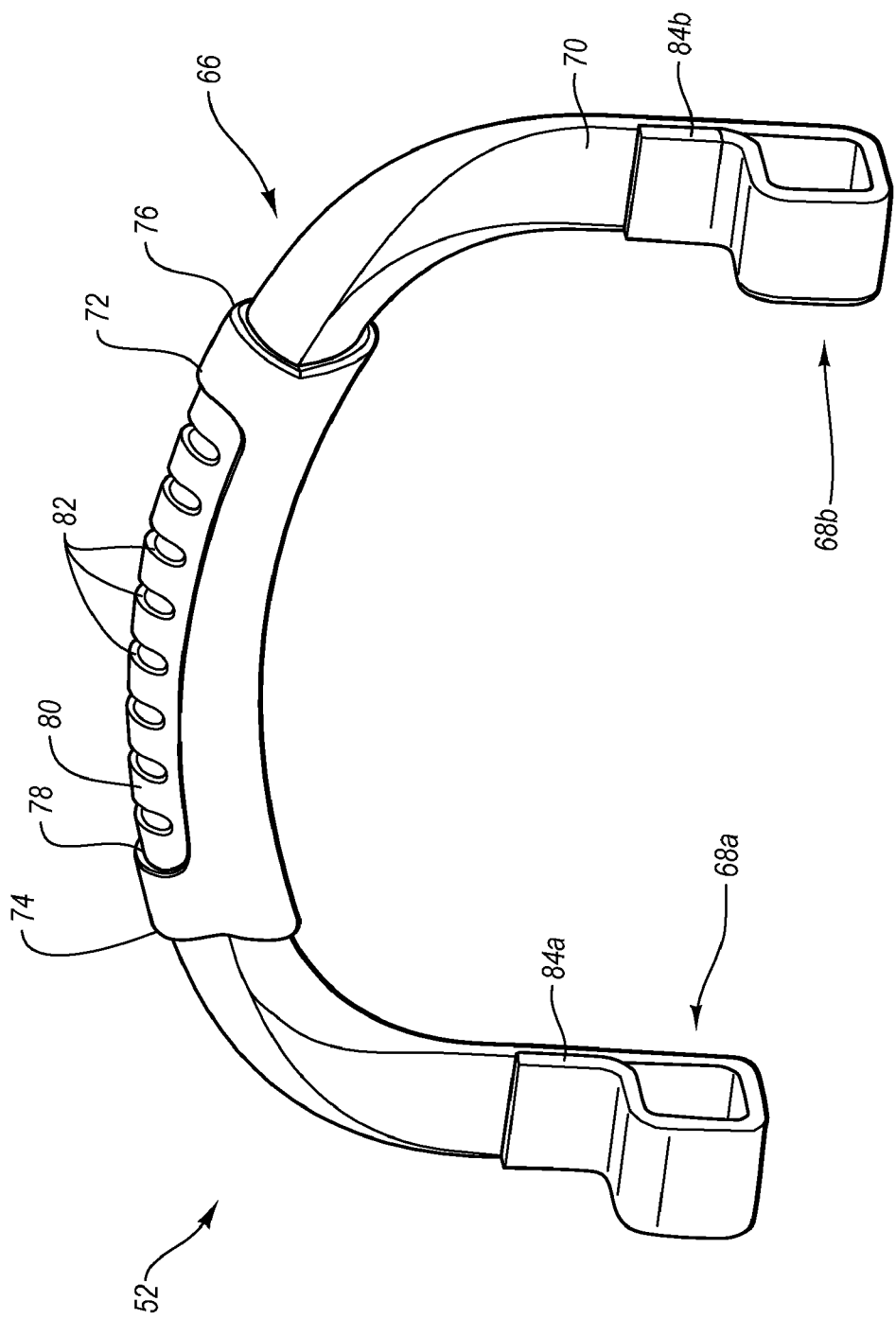
FIG. 6 is a perspective view of a portion of the table shown in FIG. 2, illustrating an exemplary embodiment of the handle.

As discussed above, the handle 52 may be used to move and carry the table 10. For example, as shown in FIG. 6, an exemplary embodiment of the handle 52 includes a gripping portion 66 that is sized and configured to allow a person to grip the handle. The handle 52 may also include one or more attachment portions 68 that may be used to attach the handle 52 to the table 10. As discussed in greater detail below, the handle 52 is preferably attached to the frame 42 may the attachment portions 68, but the handle could be attached to any suitable portion of the table 10.

As shown in FIG. 6, the gripping portion 66 of the handle 52 may include an elongated strap 70 and a handle section 72. The strap 70 may be constructed from a generally flexible material such as, for example, nylon webbing. The handle section 72 preferably is constructed an elastomeric or resilient material, such as rubber or plastic. Preferably, the strap 70 is constructed from a readily and easily flexible material to allow the handle 52 to be quickly and easily positioned in the desired location and the handle section 72 is constructed from a less flexible material so that the handle section is easier for the user to grip and hold. It will be appreciated that the strap 70 and/or handle portion 72 may be constructed from more or less flexible materials and materials with other suitable characteristics. It will also be appreciated that the strap 70 and/or handle portion 72 may also be constructed from other materials with appropriate qualities such as metal, plastic and the like.

The handle section 72 may include a first end 74 and a second end 76. The handle section 72 may also include one or more openings that are sized and configured to allow the strap 70 to be inserted through the handle section 72. In particular, the handle section 72 may have a first opening proximate the first end 74 and a second opening proximate the second end 76, and the strap 70 may be inserted through the openings to connect the handle section and the strap. It will be understood that the handles section 72 may be connected to the strap 70 by other suitable means.

As shown in the accompanying figures, the handle section 72 may include a recessed portion 78 with a lower surface 80. The lower surface 80 of the recessed portion may include one or more gripping portions 82 such as depressions, recesses, apertures, slots and the like. Advantageously, the gripping portions 82 may allow the handle portion 72 to be more easily securely grasped by the user. In addition, the gripping portions may increase the flexibility of the handle section 72, which may also facilitate a person griping the handle section 72. It will be appreciated that the gripping portions 8 may have other suitable shapes and sizes, but the gripping portions are not required.

The attachment portions 68*a*, 68*b* are preferably sized and configured to allow the handle 52 to be quickly and easily attached to the table 10. For example, the attachment portions 68*a*, 68*b* may include end portions 84*a*, 84*b* respectively. The end portions 84*a*, 84*b* may be formed at the ends of the strap 70, for example, by sewing or stitching the strap or by using materials such as Velcro®. In greater detail, the attachment portions 68*a*, 68*b* may be sized and configured to be attached to a portion of the table 10 such as the frame 42. Preferably, as seen in FIG. 2, the attachment portions 68*a*, 68*b* are attached to the side rail 44*a* of the frame 42, but the attachment portions could be attached to other portions of the frame 42, the table top 12 or table. Advantageously, the side rail 44*a* may be inserted through or directly attached to the attachment portions 68*a*, 68*b*. As shown in FIG. 2, the attachment portions 68*a*, 68*b* may be also attached to the side rail 44*a* using one or more mechanical fasteners such as screws, bolts and the like. Of course, the handle 52, including the strap 70 and/or the attachment portions 68*a*, 68*b*, may be attached to the table using a variety of other suitable means such as clamps, adhesives and the like.

Advantageously, the handle 52 may be located in a variety of positions, which may facilitate carrying, using, packaging, shipping and/or storing the table. For example, the handle 52 may be positioned in an extended position for carrying the table 10, as illustrated in FIGS. 2 and 4. Also, the handle 52 may be positioned in a retracted or storage position, which may facilitate using, packaging, shipping and/or storing the table. Indeed, as discussed below, the handle may be disposed in a retracted or storage position (such as proximate the lower surface 16 of the table top 12) so that it does not interfere with the desired use of the table. The handle 52, however, may be readily moved into the extended position to allow the table 10 to be carried or moved.

Figure 8:
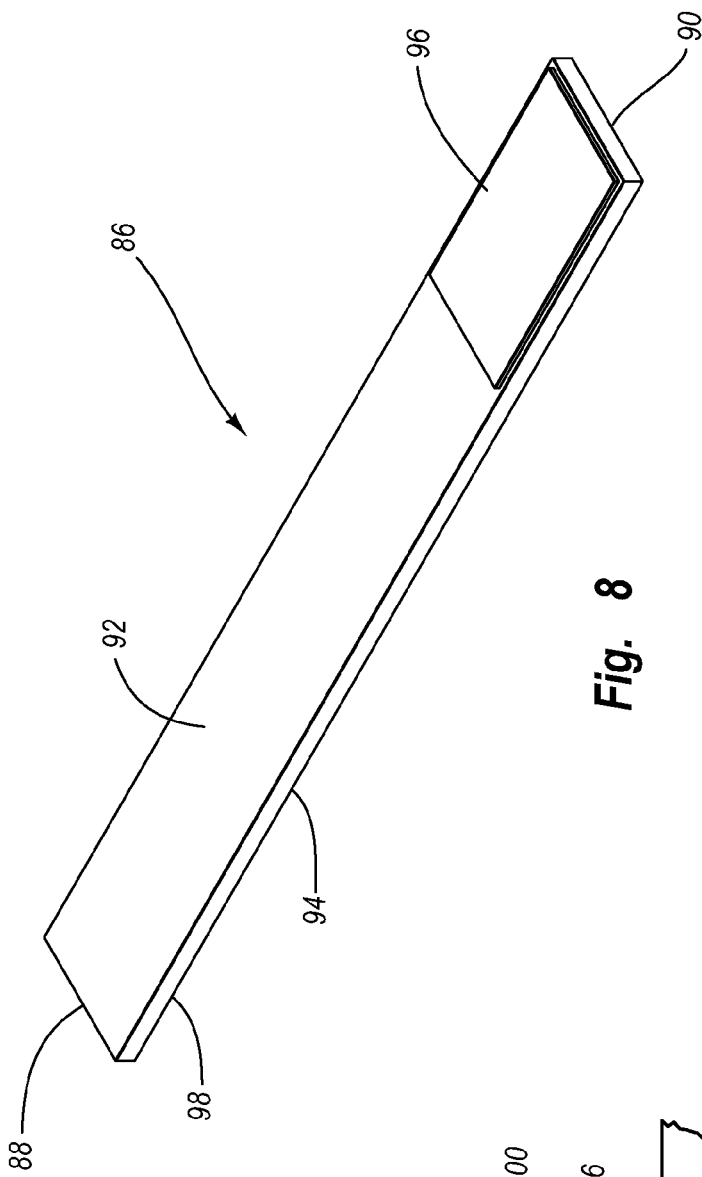
FIG. 8 is a perspective view of another exemplary embodiment of a handle retention member that may be used in connection with a handle.
Figure 7:
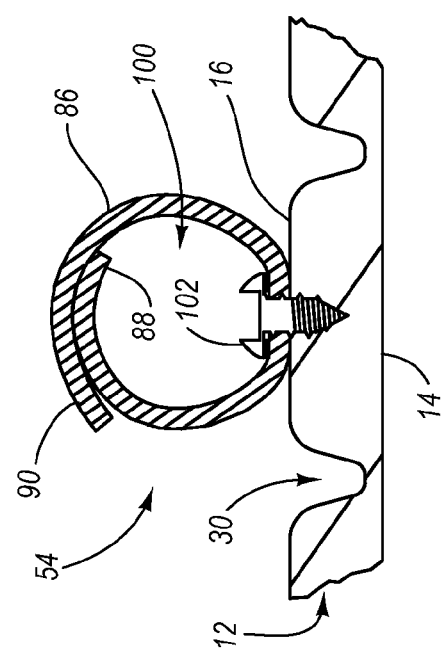
FIG. 7 is a cross-sectional side view of a portion of the table shown in FIG. 2, illustrating an exemplary embodiment of a handle retention assembly.

As discussed above, the table 10 may also include a handle retention assembly 54 that is sized and configured to maintain the handle 52 is a fixed position. The handle retention assembly 54 may include a handle retention member 86 and, as shown in FIGS. 7 and 8, the handle retention member may include an elongated strip of generally flexible material, such as nylon webbing. The handle retention member 86 may include a first end 88, a second end 90, an upper surface 92, a lower surface 94, a first attachment portion 96 and a second attachment portion 98. Advantageously, the first attachment portion 96 and the second attachment portion 98 may be interconnected, if desired. Preferably, the first and second attachment portions 96, 98 are selectively attached to allow the handle 52 to be selectively retained by the handle retention assembly 54. In particular, the first and second attachment portions 96, 98 may include Velco® to attach the attachment portions to be selectively attached, but it will be appreciated that the attachment portions could be connected by any suitable means such as buttons, snaps, fasteners, and the like.

The handle retention member 86 may form a retention area 100 that is preferably proximate the lower surface 16 of the table top 12. Advantageously, the handle retention member 86 and/or the retention area 100 are preferably sized and configured to receive and releasably retain all or a portion of the handle 52 in a generally fixed position relative to the table top 12. The handle retention member 86 and/or the retention area 100 may also be sized and configured to receive and releasably retain all or a portion of the handle 52 proximate the lip 28 of the table top 12. In addition, the handle retention member 86 and/or the retention area 100 may be sized and configured to receive and releasably retain all or a portion of the handle 52 at least partially between the lower portion of the lip 28 and the lower surface 16 of table top 12. Further, the handle retention member 86 and/or the retention area 100 may be sized and configured to receive and releasably retain all or a portion of the handle 52 between the first and second table top sections 32*a*, 32*b* when the table top 12 is in the folded position. Advantageously, the handle retention assembly 54 may store the handle 52 in an out of the way or unobtrusive position. Thus, for example, the handle 52 need not dangle in an obstructive position that could annoy a user. Further, the handle 52 need not obstruct or otherwise hinder packaging, shipping, and/or storing the table 10.

As shown in FIG. 7, the handle retention assembly 54 may be connected to the table top 12 using, for example, one or more suitable fasteners 102, such as screws, bolts, nails, rivets and the like. Of course, the handle retention assembly 54 may be connected to the table top using other suitable types of devices, connections, adhesives and the like.

Advantageously, the handle 52 and the handle retention assembly 54 may be quickly and easily manufactured and attached to the table 10. In addition, the handle 52 and the handle retention assembly 54 are not complex mechanisms and they do not require significant modifications to the table 10. Further, the handle 52 and the handle retention assembly 54 may be used in connection with a wide variety of types of tables and these components may be attached to existing or new tables. Additionally, the handle 52 and the handle retention assembly 54 can be integrally formed as part of the table 10, if desired. On the other hand, the handle 52 and the handle retention assembly 54 could be attached to any suitable portions of the table 10 using any appropriate type of connections, devices, structures and the like.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A portable table comprising:
    a table top comprising:
        a first half of the table top;
        a first lip extending downwardly from the first half of the table top, the first lip including an inner surface, an outer surface and a lower surface;
        a second half of the table top; and
        a second lip extending downwardly from the second half of the table top, the second lip including an inner surface, an outer surface and a lower surface, the first half and the second half of the table top movable between a folded position and an unfolded position, the unfolded position including an upper surface of the first half of the table top generally aligned with an upper surface of the second half of the table top, the folded position including the lower surface of the first lip is disposed at least adjacent and generally parallel to the lower surface of the second lip;

a frame including a first portion connected to the first half of the table top and a second portion connected to the second half of the table top;

a first leg movable between an extended position and a collapsed position relative to the first half of the table top;

a second leg movable between the extended position and the collapsed position relative to the second half of the table top;

a handle connected to the table top, the handle selectively movable between a use position and a storage position, the handle comprising:

a strap constructed from a relatively flexible material, the strap including a first end and a second end, the strap having a thickness that allows the strap to be disposed between the lower surface of the first lip and the lower surface of the second lip when the table top is in the folded position;

a first attachment portion formed from the first end of the strap, the first attachment portion connected to a first portion of the frame;

a second attachment portion formed from the second end of the strap, the second attachment portion connected to a second portion of the frame; and a gripping portion disposed between the first end and the second end of the strap, the gripping portion being sized and configured to be grasp by the user when the handle is in the use position; and wherein, when the handle is in the storage position, the strap and the gripping portion are spaced apart from the lower surface of the first lip and the lower surface of the second lip;

wherein, when the handle is in the storage position, the handle is not disposed between the lower surface of the first lip and the lower surface of the second lip when the table top is in the folded position;

wherein, when the handle is in the use position and the table top is in the folded position, the strap of the handle is disposed between the lower surface of the first lip and the lower surface of the second lip; and wherein, when the handle is in the use position and the table top is in the folded position, the gripping portion of the handle is disposed proximate the outer surface of the first lip and the outer surface of the second lip.

2. The portable table as in claim 1, further comprising a handle retention assembly with a flexible strap that is sized and configured to selectively receive and retain the gripping portion of the handle.

3. The portable table as in claim 1, wherein the first attachment portion includes a portion of the first end of the strap that is folded over upon itself and the second attachment portion includes a portion of the second end of the strap that is folded over upon itself.

4. The portable table as in claim 1, further comprising a handle retention assembly that is sized and configured to receive and retain at least a portion of the handle in a generally fixed position relative to the lower surface of the table top.

5. The portable table as in claim 1, further comprising a handle retention assembly that is sized and configured to receive and retain at least a portion of the handle in a generally fixed position between the first portion of the table top and the second portion of the table top when the table top is in the folded position.

6. The portable table as in claim 1, wherein the first attachment portion and the second attachment portion of the handle are attached to a side rail of the frame.

7. The portable table as in claim 1, wherein the first lip is disposed along a first side and a second side of the first portion of the table top; and wherein the second lip is disposed along a first side and a second side of the second portion of the table top.

8. A portable table comprising:
a table top comprising:
a first half of the table top;
a first lip extending downwardly from the first half of the table top, the first lip including an inner surface, an outer surface and a generally planar lower surface, the first lip having a generally constant height measured from a lower surface of the first portion of the table top to the generally planar lower surface;
a second half of the table top; and
a second lip extending downwardly from the second half of the table top, the second lip including an inner surface, an outer surface and a generally planar lower surface, the second lip having a generally constant height measured from a lower surface of the second portion of the table top to the generally planar lower surface, the first half and the second half of the table top being capable of being moved between a folded position and an unfolded position, the unfolded position including an upper surface of the first half of the table top generally aligned with an upper surface of the second half of the table top, the folded position including the generally planar lower surface of the first lip being disposed at least adjacent and generally parallel to the generally planar lower surface of the second lip;

a first leg movable between an extended position and a collapsed position relative to the table top;

a second leg movable between the extended position and the collapsed position relative to the table top;

a frame including a first portion connected to the first half of the table top and a second portion connected to the second half of the table top; and a handle movable between a storage position and a use position, the handle comprising:

a strap including a first attachment portion connected to the first half of the table top and a second attachment portion connected to the first half of the table top; and a gripping portion attached to the strap, the gripping portion being disposed proximate and spaced inwardly from the inner surface of the first lip when the handle is in the storage position, the gripping portion being disposed proximate and spaced outwardly from the outer surface of the first lip and the outer surface of the second lip when the handle is in the use position;

wherein, when the handle is in the use position and the table top is in the folded position, the strap of the handle is disposed between the generally planar lower surface of the first lip and the generally planar lower surface of the second lip; and wherein, when the handle is in the storage position, the handle is spaced apart from the generally planar lower surface of the first lip and the generally planar lower surface of the second lip and the strap is not disposed between the generally planar lower surface of the lip and the generally planar lower surface of the second lip.

9. The portable table as in claim 8, further comprising a handle retention assembly that is sized and configured to receive and retain the handle in a generally fixed position proximate the lower surface of the table top.

10. A table comprising:
a table top constructed from plastic, the table top comprising:
   a first portion of the table top;
   a first lip extending downwardly from the first portion of the table top, the first lip including a lower surface that is spaced apart from the first portion of the table top, the first lip being integrally formed with the first portion of the table top as part of a unitary, one-piece structure;
   a second portion of the table;
   a second lip extending downwardly from the second portion of the table top, the second lip including a lower surface that is spaced apart from the second portion of the table top, the second lip being integrally formed with the second portion of the table top as part of a unitary, one-piece structure; and
   wherein the first portion of the table top and the second half of the table top are capable of being moved between a folded position and an unfolded position, the unfolded position including an upper portion of the first portion of the table top generally aligned with an upper portion of the second portion of the table top, the folded position including the lower surface of the first lip disposed at least adjacent the lower surface of the second lip;
a frame comprising:
   a first portion connected to the first portion of the table top; and
   a second portion connected to the second portion of the table top;
a first leg movable between an extended position and a collapsed position relative to the table top;
a second leg movable between the extended position and the collapsed position relative to the table top; and
a handle comprising:
   an attachment portion connecting the handle to the table;
   a gripping portion that is sized and configured to be grasp by the user when the handle is in the use position; and
   a connecting portion disposed between the gripping portion and the attachment portion, the connecting portion having a thickness that allows the connecting portion to be disposed between the lower surface of the first lip and the lower surface of the second lip when the table top is in the folded position;
wherein, when the handle is in a storage position, the connecting portion is spaced apart from and not disposed between the lower surface of the first lip and the lower surface of the second lip, and the gripping portion is disposed at least proximate a lower portion of the first portion of the table top; and
wherein, when the handle is in a use position and the table top is in the folded position, the connecting portion of the handle is disposed between the lower surface of the first lip and the lower surface of the second lip, and the gripping portion is disposed proximate an outer surface of the first lip and an outer surface of the second lip.

11. The table as in claim 10, further comprising a handle retention assembly that is sized and configured to receive and retain the handle in a generally fixed position at least proximate the lower portion of the first portion of the table top when the handle is in the storage position.

12. The table as in claim 10, wherein the gripping portion is constructed from a more rigid material and the connecting portion is constructed from a more flexible material when compared to the griping portion.

13. The table as in claim 10, wherein the gripping portion is constructed from a relatively flexible material and the gripping portion is constructed from a material that is less flexible than the connecting portion.

14. The table as in claim 10, wherein the gripping portion is disposed outwardly and away from the first portion and the second portion of the table top when the table top is in the folded position to facilitate moving the table.

15. The table as in claim 10, wherein the handle is at least partially constructed from a relatively flexible material with a relatively small thickness to allow the connecting portion of the handle to be disposed between the lower surface of the first lip and the lower surface of the second lip when the table top is in the folded position.

16. The table as in claim 10, further comprising a handle retention assembly that is sized and configured to receive and retain the handle in the storage position, the handle retention assembly including a flexible strap that is connected to the table top.

17. The table as in claim 10, wherein the attachment portion includes a first portion that is connected to a first portion of the frame and a second portion that is connected to the first portion of the frame.

18. The table as in claim 10, wherein the first lip and the second lip do not include any notches or openings that are sized and configured to receive any portion of the handle.

19. The table as in claim 10, further comprising a handle retention assembly that is sized and configured to receive and retain the handle in a generally fixed position proximate the lower portion of the first section of the table top when the handle is in the storage position.

20. The table as in claim 10, further comprising a handle retention assembly that is sized and configured to receive and retain the handle in a generally fixed position when the handle is in the storage position, the handle retention assembly including a retention area that is sized and configured to receive a portion handle, the handle retention assembly being spaced apart from the lip and being connected to the lower portion of the first section of the table top.

* * * * *

UNITED STATES PATENT AND TRADEMARK OFFICE
CERTIFICATE OF CORRECTION

| | | |
|---|---|---|
| PATENT NO. | : 8,156,875 B2 | Page 1 of 1 |
| APPLICATION NO. | : 12/815284 | |
| DATED | : April 17, 2012 | |
| INVENTOR(S) | : Neunzert et al. | |

It is certified that error appears in the above-identified patent and that said Letters Patent is hereby corrected as shown below:

On the Face Page, in Field (57), under "ABSTRACT", in Column 2, Line 3, delete "of being moved" and insert -- of --, therefor.

In Column 15, Line 66, delete "Velco®" and insert -- Velcro® --, therefor.

Signed and Sealed this
Fifth Day of June, 2012

David J. Kappos
*Director of the United States Patent and Trademark Office*